(12) United States Patent
Ozawa (10) Patent No.: US 8,855,726 B2
(45) Date of Patent: Oct. 7, 2014

(54) FOLDING PORTABLE DEVICE AND CONNECTING MECHANISM (75) Inventor: Jiro Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 682 days.

(21) Appl. No.: 12/593,330

(22) PCT Filed: Mar. 21, 2008

(86) PCT No.: PCT/JP2008/000681
§ 371 (c)(1),
(2), (4) Date: Sep. 28, 2009

(87) PCT Pub. No.: WO2008/117529
PCT Pub. Date: Oct. 2, 2008

(65) Prior Publication Data
US 2010/0144406 A1 Jun. 10, 2010

(30) Foreign Application Priority Data

Mar. 28, 2007 (JP) .................................. 2007-083832

(51) Int. Cl.
H04M 1/00 (2006.01)
G06F 1/16 (2006.01)
H04M 1/02 (2006.01)

(52) U.S. Cl.
CPC ............. G06F 1/1683 (2013.01); G06F 1/1618 (2013.01); G06F 1/1681 (2013.01); H04M 1/0216 (2013.01); H04M 1/0214 (2013.01)
USPC .................. 455/575.1; 455/575.3; 455/575.4; 379/428.01; 379/428.02; 379/433.01; 379/433.12; 379/433.13

(58) Field of Classification Search
USPC ............ 455/575.1, 575.3, 575.4; 379/428.01, 379/428.02, 433.01, 433.11–433.13
See application file for complete search history.

(56) References Cited

U.S. PATENT DOCUMENTS 6,223,393 B1 5/2001 Knopf
6,532,147 B1 3/2003 Christ, Jr.
(Continued)

FOREIGN PATENT DOCUMENTS

EP 1 414 219 A1 4/2004
JP H0463494 A 2/1992
(Continued)

OTHER PUBLICATIONS

The Extended European Search Report for EP 08720561.3 dated on Feb. 19, 2013.
(Continued)

Primary Examiner — Raymond Dean
(74) Attorney, Agent, or Firm — Sughrue Mion, PLLC (57) ABSTRACT A folding portable device is provided, in which a connecting mechanism that mechanically connects a first housing and a second housing to each other includes a plurality of first members including a first plane and two engaging pieces provided on the first plane, and a plurality of second members including a second plane, an engaging groove provided on the second plane for the engaging piece to be slidably fitted, and a stopper. The first member is engaged with one of the second members by means of one of the two engaging pieces, and with another second member adjacent to the one second member by means of the other of the two engaging pieces, and the connecting mechanism includes therein a hollow portion formed along an extending direction of the engaging groove, and the hollow portion includes therein the flexible printed circuit board.

19 Claims, 9 Drawing Sheets

(56) References Cited

U.S. PATENT DOCUMENTS

2006/0124674 A1 * 6/2006 Chan .......................... 224/164
2007/0032105 A1   2/2007 Lee et al.

FOREIGN PATENT DOCUMENTS

| | | | |
|---|---|---|---|
| JP | 2002-111823 A | | 4/2002 |
| JP | 2002111823 A | * | 4/2002 |
| JP | 2003-032335 A | | 1/2003 |
| JP | 2004-235687 A | | 8/2004 |
| JP | 200561559 A | | 3/2005 |
| JP | 2005-176370 A | | 6/2005 |
| JP | 2006-019853 A | | 1/2006 |
| JP | 2006019853 A | * | 1/2006 |

OTHER PUBLICATIONS

Japanese Office Action for JP2009-506210 mailed on Jan. 29, 2013.

* cited by examiner

FOLDING PORTABLE DEVICE AND CONNECTING MECHANISM

TECHNICAL FIELD

The present invention relates to a folding portable device and a connecting mechanism.

BACKGROUND ART

Examples of the folding portable device include what is known as a folding mobile phone unit, constituted of an upper housing with a display screen and a lower housing with input keys connected to each other by means of a hinge mechanism, such that the upper housing and the lower housing are set to relatively rotate with respect to each other.

Such folding mobile phone unit can only assume, however, either a state that the upper housing is superposed on the lower housing (closed state), or a state that the upper housing is inclined with respect to the lower housing (open state), and therefore a folding mobile phone unit having improved relative positioning capability between the upper housing and the lower housing has been proposed, for example in JP-A No. 2006-19853.

Figure 12A:
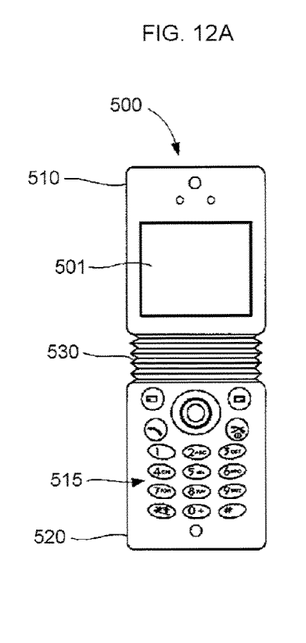
FIG. 12A is a front view of a conventional folding mobile phone unit, 12B a rear view thereof, and 12C a side view from the right thereof.
Figure 12B:
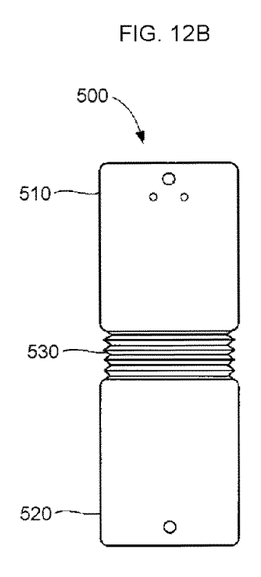
Figure 12C:
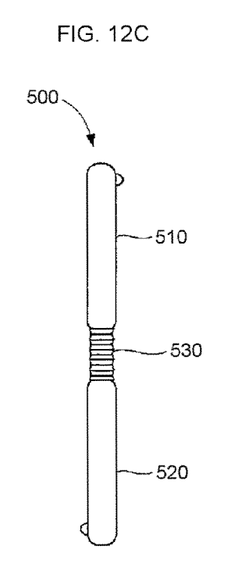
Figure 13A:
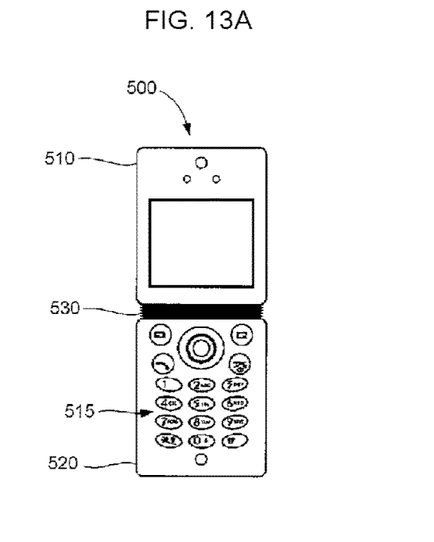
FIG. 13A is a front view of the conventional folding mobile phone unit, and 13B a side view from the right thereof.

FIGS. 12A and 13A are front views of the folding mobile phone unit disclosed in the cited document; FIG. 12B is a rear view of the same folding mobile phone unit; FIGS. 12C, 13B, 14A, 14B and 14C are side views from the right of the same folding mobile phone unit.

As shown in FIG. 12A for example, the folding mobile phone unit 500 according to the cited document includes an upper housing 510 having a display screen 501, a lower housing 520 having a plurality of data input keys 515 disposed thereon, and a bellows-type connecting member 530 that connects the upper housing 510 and the lower housing 520.

The bellows-type connecting member 530 is made of a flexible synthetic resin, and hence has expandability and bendability.

Figure 13B:
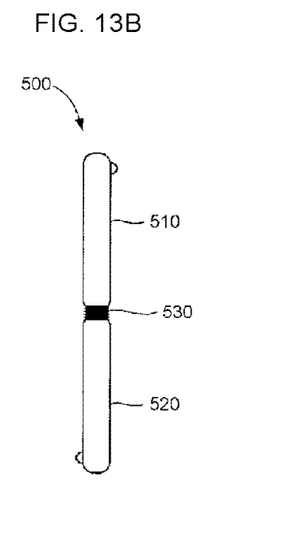

Because of the expandability of the bellows-type connecting member 530, the bellows-type connecting member 530 can be expanded so as to locate the upper housing 510 and the lower housing 520 farther away from each other, as shown in FIGS. 12A, 12B and 12C. The bellows-type connecting member 530 can also be compressed as shown in FIGS. 13A and 13B, so that the upper housing 510 and the lower housing 520 are located close to each other.

Figure 14A:
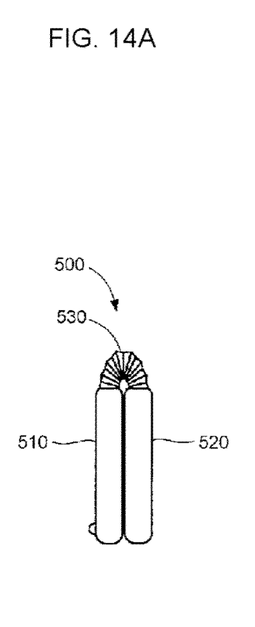
FIGS. 14A, 14B and 14C are side views from the right of the conventional folding mobile phone unit.
Figure 14B:
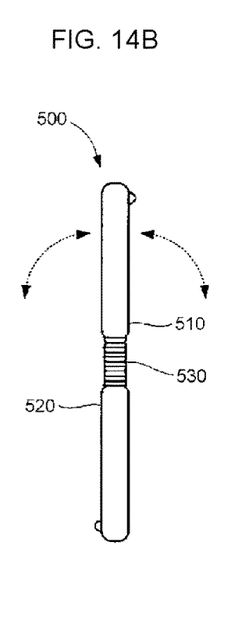
Figure 14C:
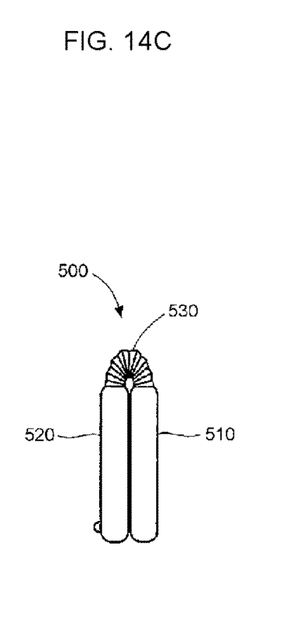

Further, because of the bendability of the bellows-type connecting member 530, the bellows-type connecting member 530 can be bent so as to fold the folding mobile phone unit 500 from the state shown in FIG. 14B into the state shown in FIGS. 14A and 14C, such that the upper housing 510 and the lower housing 520 are superposed on each other.

Figure 15A:
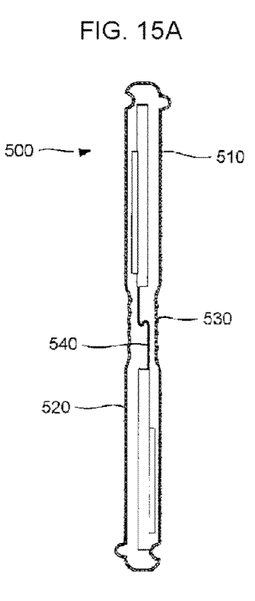
FIGS. 15A, 15B and 15C are vertical cross-sectional views showing an internal structure of the conventional folding mobile phone unit.
Figure 15B:
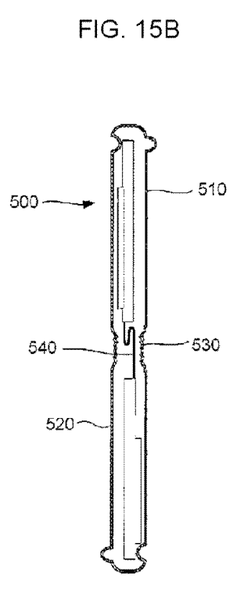
Figure 15C:
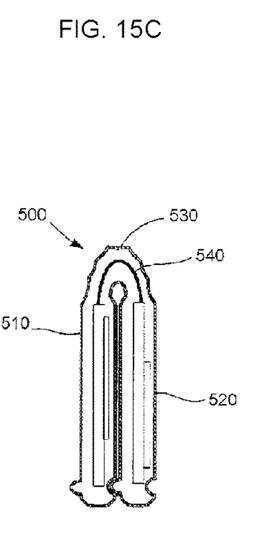

FIGS. 15A, 15B and 15C are vertical cross-sectional views showing an internal structure of the folding mobile phone unit 500.

As shown in FIGS. 15A, 15B and 15C, the bellows-type connecting member 530 is of a hollow structure, and includes therein a flexible printed circuit board 540 that electrically connects the upper housing 510 and the lower housing 520. The flexible printed circuit board 540 can be expanded, compressed and bent in accordance with such motions of the bellows-type connecting member 530, to thereby maintain the electrical connection between the upper housing 510 and the lower housing 520.

[Patented document 1] JP-A No. 2006-019853

DISCLOSURE OF THE INVENTION

Repetitions of the expanding, compressing and bending motions of the bellows-type connecting member 530 of the conventional folding mobile phone unit 500 exert a repeated load to the bellows-type connecting member 530.

Also, in case that the folding mobile phone unit 500 falls on the ground, the bellows-type connecting member 530 suffers an impact load.

Whereas the bellows-type connecting member 530 of the conventional folding mobile phone unit 500 is made of a sheet-shaped synthetic resin in a hollow structure, the sheet-shaped synthetic resin is not so resistant against the repeated load and the impact load.

Accordingly, the repeated load may cause the synthetic resin constituting the bellows-type connecting member 530 to be partially hardened from fatigue, and thus to lose the expandability and the bendability.

Besides, the impact load instantaneously applies a great force to the folding mobile phone unit 500, to thereby often break the bellows-type connecting member 530.

In case that the synthetic resin constituting the bellows-type connecting member 530 is thus fatigued or broken, the conventional folding mobile phone unit 500 becomes no longer usable.

The present invention has been accomplished in view of the foregoing problem incidental to the conventional folding mobile phone unit, with an object to provide a connecting mechanism resistant to the repeated load and the impact load, and a folding portable device that includes such connecting mechanism.

According to the present invention, there is provided a folding portable device, including:
a first housing;
a second housing;
a connecting mechanism that mechanically connects the first housing and the second housing to each other; and
a flexible printed circuit board that electrically connects the first housing and the second housing to each other;
wherein the connecting mechanism includes:
a plurality of first members including a first plane, and two engaging pieces provided on the first plane;
a plurality of second members including a second plane, an engaging groove provided on the second plane for the engaging piece to be slidably fitted, and a stopper that prevents the engaging piece fitted in the engaging groove from coming off therefrom;
the first member is engaged with one of the second members by means of one of the two engaging pieces, and with another second member adjacent to the first mentioned second member by means of the other of the two engaging pieces; and
the connecting mechanism includes therein a hollow portion formed along an extending direction of the engaging groove, and the hollow portion includes therein the flexible printed circuit board.

In the folding portable device according to the present invention, the engaging piece may be erected on the first plane; the second member may include a pair of the second planes parallel to each other; the second plane may respectively include the engaging groove linearly extending in the same direction; and the hollow portion may be formed inside the second member so as to avoid interference with the engaging groove.

In the folding portable device according to the present invention, the engaging piece may include a first columnar portion erected on the first plane, and a second columnar portion formed on the first columnar portion so as to extend therefrom and larger in diameter than the first columnar portion, and the engaging groove may include a first engaging groove formed on the second plane for the first columnar portion to slide therealong, and a second engaging groove formed so as to extend from the first engaging groove, for the second columnar portion to slide therealong.

In the folding portable device according to the present invention, the hollow portion may be formed inside the first member or the second member. The first member or the second member including the hollow portion may respectively be constituted of a combination of a plurality of block members, and at least one of the plurality of block members includes a recessed portion formed along an extending direction of the engaging groove, so that the hollow portion is formed inside the first member or the second member by combining the plurality of block members.

In the folding portable device according to the present invention, the second member may be constituted of, for example, two block members. In this case, the two block members each include a pair of planes parallel to each other; one of the pair of planes may include the engaging groove and the other of the pair of planes may include the recessed portion formed so as to avoid interference with the engaging groove; and the second member may be formed by combining the two block members via the latter planes.

The folding portable device may be exemplified by a folding mobile phone unit.

According to the present invention, there is also provided a connecting mechanism that mechanically connects a first housing and a second housing to each other, in a folding portable device including the first housing, the second housing, and a flexible printed circuit board that electrically connects the first housing and the second housing to each other, including:

a plurality of first members including a first plane, and two engaging pieces provided on the first plane; and a plurality of second members including a second plane, an engaging groove provided on the second plane for the engaging piece to be slidably fitted, and a stopper that prevents the engaging piece fitted in the engaging groove from coming off therefrom;

wherein the first member is engaged with one of the second members by means of one of the two engaging pieces, and with another second member adjacent to the first mentioned second member by means of the other of the two engaging pieces; and the connecting mechanism includes therein a hollow portion formed along an extending direction of the engaging groove, and the hollow portion includes therein the flexible printed circuit board.

In the connecting mechanism according to the present invention, the engaging piece may be erected on the first plane; the second member may include a pair of the second planes parallel to each other; the second plane may respectively include the engaging groove linearly extending in the same direction; and the hollow portion may be formed inside the second member so as to avoid interference with the engaging groove.

In the connecting mechanism according to the present invention, the engaging piece may include a first columnar portion erected on the first plane, and a second columnar portion formed on the first columnar portion so as to extend therefrom and larger in diameter than the first columnar portion, and the engaging groove may include a first engaging groove formed on the second plane for the first columnar portion to slide therealong, and a second engaging groove formed so as to extend from the first engaging groove, for the second columnar portion to slide therealong.

In the connecting mechanism according to the present invention, the hollow portion may be formed inside the first member or the second member. The first member or the second member including the hollow portion may respectively be constituted of a combination of a plurality of block members, and at least one of the plurality of block members includes a recessed portion formed along an extending direction of the engaging groove, so that upon combining the plurality of block members the hollow portion is formed inside the first member or the second member.

In the connecting mechanism according to the present invention, the second member may be constituted of two block members. In this case, the two block members each include a pair of planes parallel to each other; one of the pair of planes may include the engaging groove and the other of the pair of planes may include the recessed portion formed so as to avoid interference with the engaging groove; and the second member may be formed by combining the two block members such that the other planes oppose each other.

Unlike the conventional folding mobile phone unit including the bellows-type connecting member constituted of a sheet-shaped synthetic resin, the connecting mechanism of the folding portable device according to the present invention has a mechanical structure, instead of a formation of the sheet-shaped synthetic resin or another single material as the bellows-type connecting member of the conventional folding mobile phone unit. Such structure provides greater resistance against the repeated load and the impact load than the bellows-type connecting member of the conventional folding mobile phone unit, and allows minimizing such defects as loss of expandability and bendability due to fatigue and breakdown because of falling.

BRIEF DESCRIPTION OF THE DRAWINGS

The above and other objects, features and advantages will become more apparent through the following exemplary embodiments and the accompanying drawings.

BEST MODE FOR CARRYING OUT THE INVENTION

Hereunder, exemplary embodiments of the present invention will be described referring to the drawings. In all the drawings, the same constituents will be given the same numeral, and the description thereof will not be repeated.

[First Exemplary Embodiment]

Figure 1:
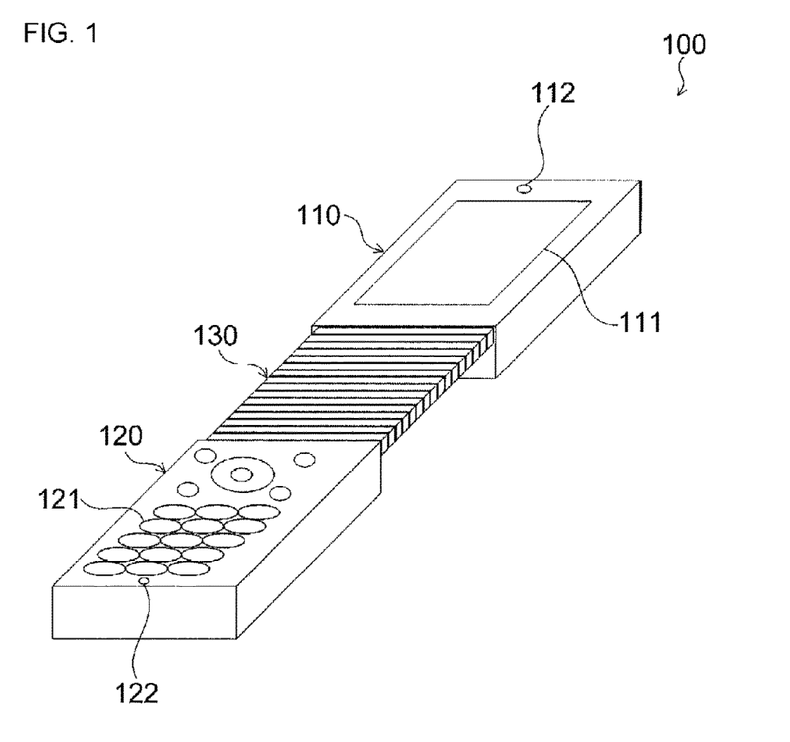
FIG. 1 is a perspective view showing a portable device according to a first exemplary embodiment of the present invention.

FIG. 1 is a perspective view showing a portable device according to a first exemplary embodiment of the present invention. In this exemplary embodiment, a mobile phone unit 100 will be described as an example of the folding portable device.

As shown in FIG. 1, the mobile phone unit 100 according to this exemplary embodiment includes a first housing 110, a second housing 120, a connecting mechanism 130 that mechanically connects the first housing 110 and the second housing 120 to each other, and a flexible printed circuit board 140 that electrically connects a driving circuit board 150 installed in the first housing 110 and a driving circuit board 152 installed in the second housing 120 to each other.

On the front face of the first housing 110 (the face that opposes the second housing 120 when the first housing 110 is superposed on the second housing 120), a display screen 111 constituted of an LCD device is provided, and also a speaker 112 is located above the display screen 111.

On the front face of the second housing 120 (the face that opposes the first housing 110 when the first housing 110 is superposed on the second housing 120), a plurality of data input keys 121 is aligned, and a microphone 122 is located below the data input keys 121.

The display screen 111 of the LCD device displays data input by the user through the data input keys 121, as well as an e-mail received from a mobile phone unit of a communication counterpart, and images of a website and so forth.

Figure 2:
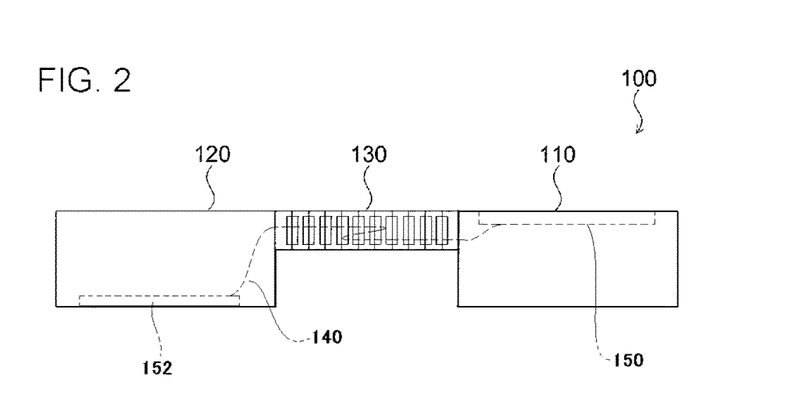
FIG. 2 is a side view of the portable device according to the first exemplary embodiment of the present invention.
Figure 3:
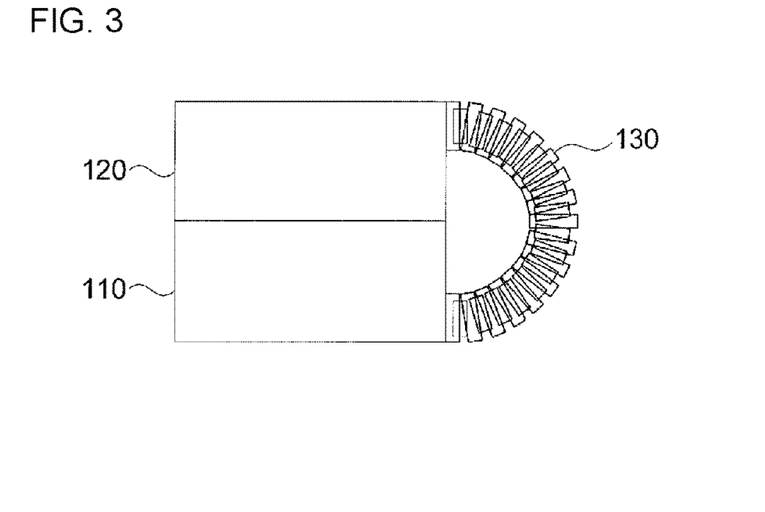
FIG. 3 is another side view of the portable device according to the first exemplary embodiment of the present invention.

FIGS. 2 and 3 are side views of the mobile phone unit 100 according to this exemplary embodiment.

The connecting mechanism 130 is, as will be subsequently described, constituted of a plurality of members slidably combined with each other. Accordingly, the connecting mechanism 130 has expandability and bendability.

Because of the expandability of the connecting mechanism 130, the connecting mechanism 130 can be expanded from the state shown in FIG. 2 so as to locate the upper housing 110 and the lower housing 120 farther away from each other. Compressing the connecting mechanism 130 can locate the upper housing 110 and the lower housing 120 at the initial position, as shown in FIG. 2.

Also, because of the bendability of the connecting mechanism 130, the connecting mechanism 130 can be bent in a semicircular shape, so as to superpose the first housing 110 and the second housing 120 on each other, with the rear face of the first housing 110 (opposite to the front face thereof) and that of the second housing 120 (opposite to the front face thereof) opposing each other as shown in FIG. 3. On the contrary, the first housing 110 and the second housing 120 can also be superposed on each other such that the front face of the first housing 110 and that of the second housing 120 oppose each other.

The connecting mechanism 130 includes a plurality of first members 210 and a plurality of second members 220.

Figure 4A:
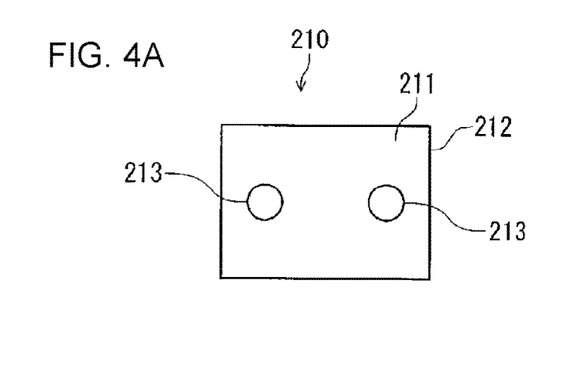
FIG. 4A is a plan view of a first member of the portable device according to the first exemplary embodiment of the present invention, 4B a front view thereof, and 4C a side view thereof.
Figure 4B:
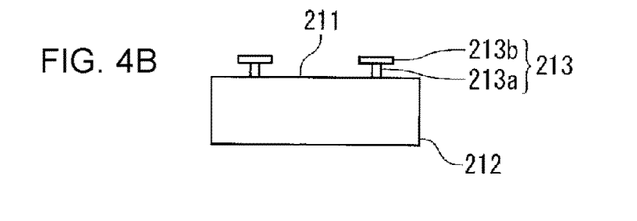
Figure 4C:
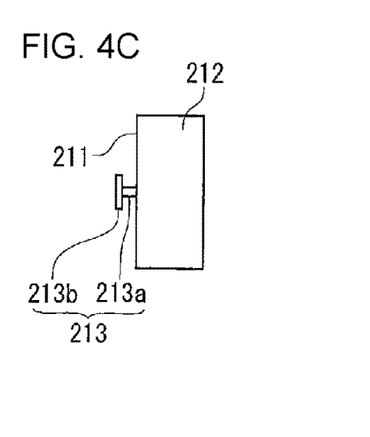

FIG. 4A is a plan view of the first member 210, 4B a front view thereof, and 4C a side view thereof.

As shown in FIGS. 4A, 4B and 4C, the first member 210 includes a rectangular parallelepiped-shaped block 212 having a first plane 211, and two engaging pieces 213 erected on the first plane 211 of the block 212.

The two engaging pieces 213 are located at vertically symmetrical positions about the center of the first plane 211.

The engaging pieces 213 each include a first columnar portion 213a erected on the first plane 211, and a second columnar portion 213b formed on the first columnar portion 213a so as to extend therefrom and larger in diameter than the first columnar portion 213a.

The first member 210 is made of a metal such as aluminum, stainless steel and so on, or a ceramic material. The first member 210 may also be made of a plastic material such as a synthetic resin and so forth.

Figure 5A:
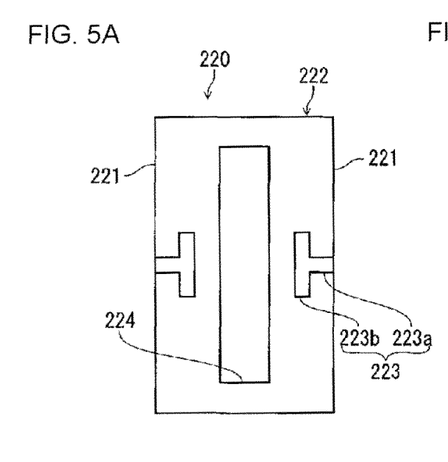
FIG. 5A is a side view of a second member of the portable device according to the first exemplary embodiment of the present invention, 5B a bottom view thereof, and 5C a front view thereof.
Figure 5B:
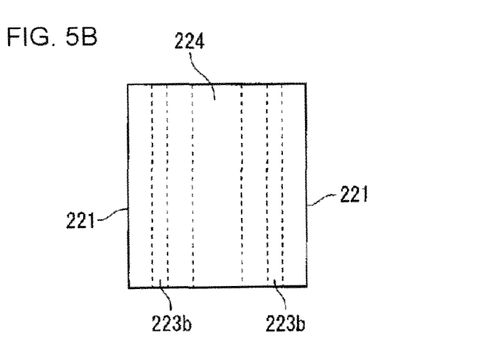
Figure 5C:
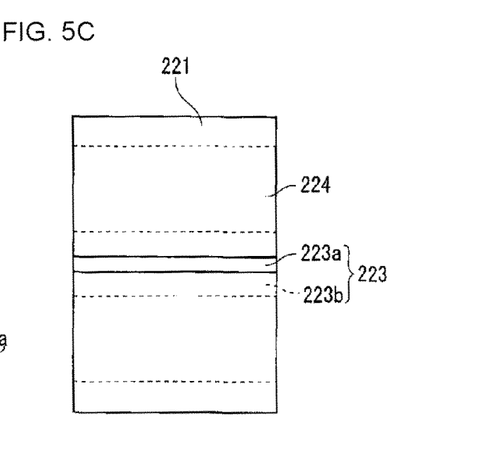

FIG. 5A is a side view of the second member 220, 5B a bottom view thereof, and 5C a front view thereof.

As shown in FIGS. 5A, 5B and 5C, the second member 220 is constituted of a cuboid block 222 that includes a pair of second planes 221 parallel to each other.

The pair of second planes 221 of the second member 220 each include an engaging groove 223 linearly extending in the longitudinal direction of the second member 220 (horizontal direction in FIG. 5C). It is to be noted that, in this exemplary embodiment, the longitudinal direction of the second member 220 means the extending direction of the engaging groove 223, which is not always the same as the direction of the longer side of the second member 220.

The engaging groove 223 is provided on the second plane 221, and includes a first engaging groove 223a in which the first columnar portion 213a of the engaging piece 213 on the first member 210 can slide, and a second engaging groove 223b formed so as to extend from the first engaging groove 223a, and in which the second columnar portion 213b of the engaging piece 213 on the first member 210 can slide.

The engaging groove 223 according to this exemplary embodiment is provided all the way from a longitudinal end portion of the second member 220 to the other end portion thereof. According to the present invention, however, the engaging groove 223 may be partially formed on the second member 220 longitudinally thereof with closed ends, as long as the engaging piece 213 can be fitted in the engaging groove 223.

The engaging groove 223 provided on each of the pair of second planes 221 is mutually symmetrically located about the center of the block 222.

Thus, the first columnar portion 213a of the engaging piece 213 on the first member 210 can slide in the first engaging groove 223a, and the second columnar portion 213b of the engaging piece 213 on the first member 210 can slide in the second engaging groove 223b, which allows the engaging piece 213 to be fitted in the engaging groove 223 and to slide in the engaging groove 223 in the extending direction thereof (in the longitudinal direction of the second member 220, in other words horizontally in FIG. 5C), without coming off from the engaging groove 223.

The connecting mechanism 130 also includes therein a hollow portion 224 formed along the extending direction of the engaging groove 223. It is not mandatory, however, that the direction of the hollow portion 224 is strictly aligned with the extending direction of the engaging groove 223.

In the connecting mechanism 130 according to this exemplary embodiment, the hollow portion 224 is provided inside the block 222 of the second member 220, held between the first members 210. The hollow portion 224 is provided in the block 222 so as to penetrate therethrough in the longitudinal direction of the second member 220 (horizontally in FIG. 5C), without interfering with the two engaging grooves 223.

The flexible printed circuit board 140 (Ref. FIG. 2) is inserted in the hollow portion 224.

The second member 220 is, like the first member 210, made of a metal such as aluminum, stainless steel and so on, or a ceramic material. The second member 220 may also be made of a plastic material such as a synthetic resin and so forth.

Figure 6:
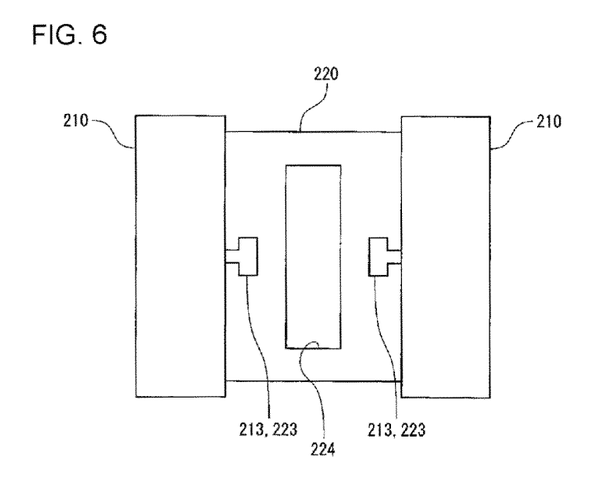
FIG. 6 is a vertical cross-sectional view showing a connected state of the first member and the second member of the portable device according to the first exemplary embodiment of the present invention.
Figure 7:
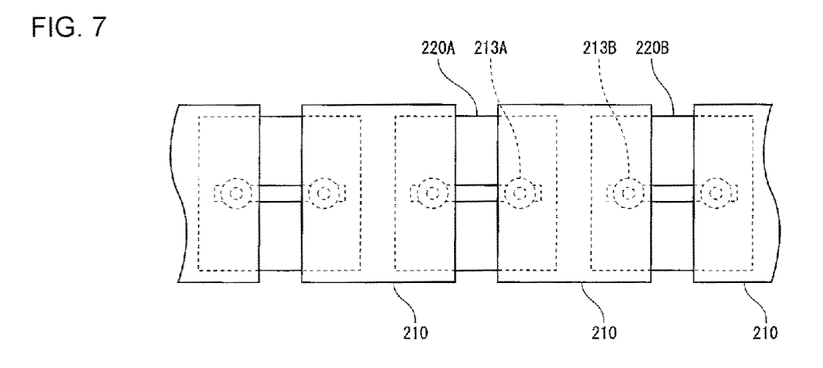
FIG. 7 is a plan view showing a connected state of the first member and the second member of the portable device according to the first exemplary embodiment of the present invention.

FIG. 6 is a vertical cross-sectional view showing a connected state of the first member 210 and the second member 220, and FIG. 7 is a plan view showing a connected state of the first member 210 and the second member 220.

As shown in FIG. 6, the first member 210 is connected with the second member 220 by fitting the engaging piece 213 in the engaging groove 223 of each second member 220, such that the first plane 211 of the first member 210 opposes each of the pair of second planes 221.

Further, as shown in FIG. 7, the first member 210 is engaged with one second member 220A by means of one 213A of the two engaging pieces 213, and with another second member 220B adjacent to the second member 220A, by means of the other 213B of the two engaging pieces 213.

The plurality of first members 210 and the plurality of second members 220 are thus mutually connected as shown in FIGS. 6 and 7, to thereby form the connecting mechanism 130 shown in FIG. 1.

Figure 8A:
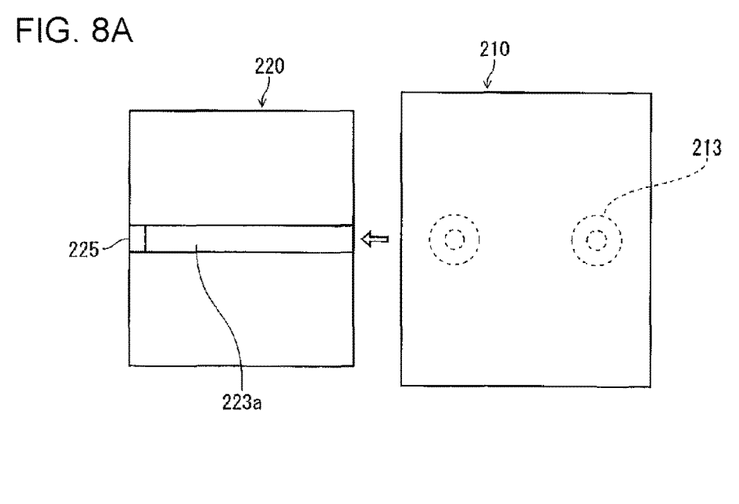
FIGS. 8A and 8B are plan views showing an example of a connecting method of the first member and the second member of the portable device according to the first exemplary embodiment of the present invention.
Figure 8B:
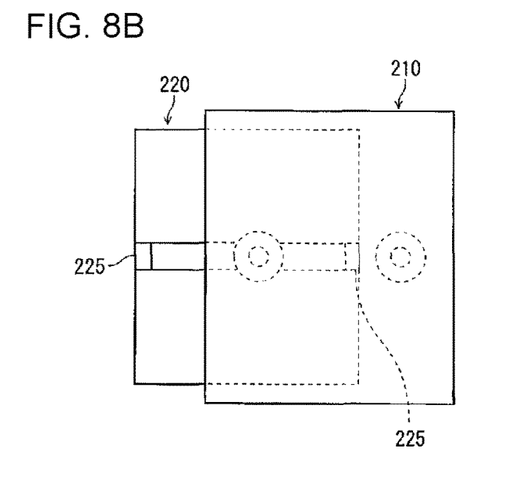

FIGS. 8A and 8B are plan views showing an example of a method of connecting the first member 210 with the second member 220.

The second member 220 with the engaging groove 223 includes a stopper that prevents the engaging piece 213 fitted in the engaging groove 223 from coming off from the engaging groove 223. The stopper may be either integrally formed with the block 222, or independently formed and attached to the block 222. In this exemplary embodiment, the stopper is exemplified by a cover member 225 attached to the block 222 so as to close an end portion of the engaging groove 223.

To be more detailed, as shown in FIG. 8A, the cover member 225 is provided so as to close an end portion of the first engaging groove 223a of the engaging groove 223 on the second member 220.

Although not shown in FIG. 8A, one of the engaging pieces of an adjacent first member is fitted in advance in the engaging groove 223. More specifically, the right-hand engaging piece of the first member left adjacent to the first member 210 shown in FIG. 8A is fitted in the first engaging groove 223a shown therein. Under such state, an end portion (left end portion in this case) of the first engaging groove 223a is closed by the cover member 225, so that the engaging piece of the left adjacent first member is prevented from coming off.

Then one of the two engaging pieces 213 of the first member 210 is fitted in the engaging groove 223 through the open end portion thereof.

After fitting one of the two engaging pieces 213 of the first member 210 in the engaging groove 223, the open end portion of the first engaging groove 223a is closed by the cover member 225, as shown in FIG. 8B.

At this stage, the engaging pieces 213 are locked inside the engaging groove 223, thus to be prevented from coming off from the engaging groove 223.

Figure 9A:
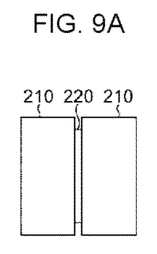
FIGS. 9A to 9C are schematic plan views showing expandability of the connecting mechanism of the portable device according to the first exemplary embodiment of the present invention.
Figure 9B:
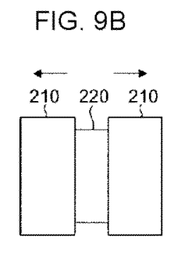
Figure 9C:
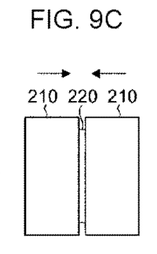

FIGS. 9A to 9C are schematic plan views showing the expandability of the connecting mechanism 130.

As shown in FIG. 9A, the two first members 210 located adjacent to each other can be moved toward each other, by sliding the engaging piece 213 of the respective first members 210 with respect to the engaging groove 223 on the second member 220 in the direction that brings the two first members 210 closer to each other.

Also, as shown in FIG. 9B, the two first members 210 can be moved away from each other, by sliding the engaging piece 213 of the respective first members 210 with respect to the engaging groove 223 on the second member 220 in the direction that separates the two first members 210 from each other.

As further shown in FIG. 9C, upon sliding the engaging piece 213 of the respective first members 210 with respect to the engaging groove 223 on the second member 220 in the direction that brings the two first members 210 closer to each other from the state shown in FIG. 9B, the two first member 210 can be located closer to each other.

As is apparent from FIGS. 9A to 9C, the structure that allows the first member 210 constituting the connecting mechanism 130 to slide with respect to the second member 220 in the longitudinal direction thereof gives the connecting mechanism 130 the expandability in the longitudinal direction of the second member 220.

Figure 10A:
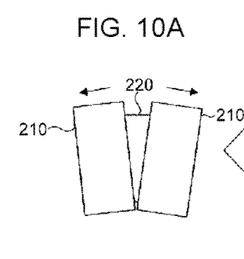
FIGS. 10A to 10C are schematic plan views showing bendability of the connecting mechanism of the portable device according to the first exemplary embodiment of the present invention.
Figure 10B:
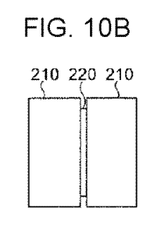
Figure 10C:
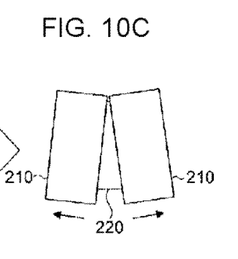

FIGS. 10A to 10C are schematic plan views showing the bendability of the connecting mechanism 130.

As shown in FIG. 10A, the two first members 210 located adjacent to each other can be inclined with respect to the second member 220 by rotating the engaging piece 213 of the respective first members 210, one clockwise (first member 210 on the right in FIG. 10A), and the other counterclockwise (first member 210 on the left in FIG. 10A), with respect to the engaging groove 223 on the second member 220.

Inclining thus each of the plurality of first members 210 with respect to the second member 220 enables bending the connecting mechanism 130 in a semicircular shape as shown in FIG. 3.

Rotating the engaging piece 213 of the respective first members 210, one counterclockwise (first member 210 on the right in FIG. 10A), and the other clockwise (first member 210 on the left in FIG. 10A) with respect to the engaging groove 223 on the second member 220 from the state shown in FIG. 10A can set the two first members 210 back to the orientation parallel to the second member 220, as shown in FIG. 10B.

As further shown in FIG. 10C, the two first members 210 located adjacent to each other can be inclined with respect to the second member 220, also by rotating the engaging piece 213 of the respective first members 210, one clockwise (first member 210 on the left in FIG. 10C), and the other counterclockwise (first member 210 on the right in FIG. 10C) with respect to the engaging groove 223 on the second member 220. In this case, the direction of the inclination is opposite to that shown in FIG. 10A.

As is apparent from FIGS. 10A to 10C, the structure that allows rotating the first member 210 constituting the connecting mechanism 130 clockwise or counterclockwise with respect to the second member 220 gives the connecting mechanism 130 the bendability in a semicircular shape.

Thus, the connecting mechanism 130 of the mobile phone unit 100 according to this exemplary embodiment has both expandability and bendability, as the bellows-type connecting member 530 of the conventional mobile phone unit shown in FIGS. 12A through 15C.

The bellows-type connecting member 530 of the conventional mobile phone unit shown in FIGS. 12A through 15C is constituted of a sheet-shaped synthetic resin (Ref. FIGS. 15A to 15C), and hence not sufficiently resistant against the repeated load and the impact load.

In contrast, the connecting mechanism 130 of the mobile phone unit 100 according to this exemplary embodiment has a mechanical structure constituted of the plurality of first members 210 and the plurality of second members 220 combined to each other, and provides significantly superior resistance against the repeated load and the impact load, when compared with the bellows-type connecting member 530 of the conventional mobile phone unit.

For example, employing stainless steel for constructing the connecting mechanism 130 can nearly completely eliminate the risk of degradation in function or breakdown originating from the repeated load and the impact load.

The structure of the mobile phone unit 100 according to this exemplary embodiment is not limited to the foregoing description, but may be modified in various manners.

To cite a few examples, although the present invention is applied to the folding mobile phone unit 100 in the first exemplary embodiment, the application of the present invention is not limited to the folding mobile phone unit. The present invention may be applied to any portable terminal device as long as the device is a folding portable terminal device.

The first exemplary embodiment may also be applied to a portable device for other purposes than wireless communication, without limitation to a portable wireless communication terminal device typically exemplified by the mobile phone unit. Specifically, the first exemplary embodiment is applicable to such portable devices as a digital camera, an audio player, or a portable TV receiver.

The first plane 211 of the first member 210 and the second plane 221 of the second member 220 do not have to have a strict planarity, as long as the first member 210 and the second member 220 are slidable with respect to each other in contact therewith. Accordingly, one or both of the first plane 211 and the second plane 221 may include a recessed portion.

The hollow portion 224 formed inside the connecting mechanism 130 in the extending direction of the engaging groove 223 may be provided in one of the first member 210 and the second member 220, or in both thereof.

The foregoing exemplary embodiment exemplifies a structure that the second member 220 is held between the first members 210 in a thicknesswise direction (horizontal direction in FIG. 5A). According to the present invention, however, the second plane 221 and the engaging groove 223 may instead be provided only on one side of the second member 220, so that the first member 210 is fitted and attached to such side of the second member 220. In other words, the first member 210 and the second member 220 may be combined on one-to-one basis. In this case, the hollow portion 224 may be provided in either of the first member 210 or the second member 220.

Contrary to the foregoing exemplary embodiment, the first member 210 may include the engaging pieces 213 sticking from both sides thereof in the thicknesswise direction (horizontal direction in FIG. 4C), so that the second member 220 is fitted and attached to the respective side of the first member 210 in the thicknesswise direction. In this case, it is preferably that the hollow portion 224 is provided inside the block 212 of the first member 210.

Although the foregoing exemplary embodiment exemplifies the structure that the engaging groove 223 is formed so as to linearly extend in the longitudinal direction of the second member 220, the present invention is not limited to such configuration. The engaging groove 223 may be curved in a predetermined curvature from the longitudinal direction of the second member 220 toward the opening direction of the mobile phone unit 100.

Also, though the foregoing exemplary embodiment exemplifies the structure that the two engaging pieces 213 are erected on the first member 210, according to the present invention three or more engaging pieces may be provided instead.

Figure 11:
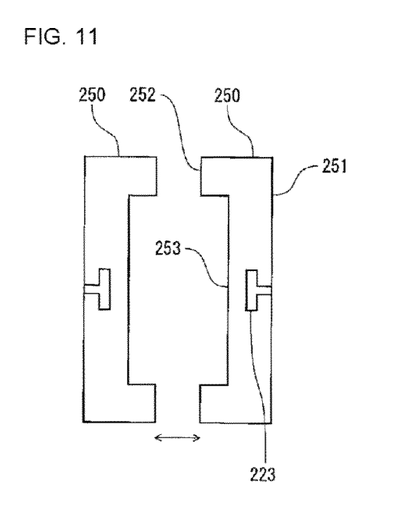
FIG. 11 is a vertical cross-sectional view of a block member.

FIG. 11 is a vertical cross-sectional view of a block member 250 that may be substituted for the second member 220.

Although the folding mobile phone unit 100 according to the first exemplary embodiment employs the second member 220 which is a single-piece component, two of the block members 250 shown in FIG. 11 may be employed in place of the single-piece second member 220.

[Second Exemplary Embodiment]

In the mobile phone unit 100 according to this exemplary embodiment, the second member 220 including the hollow portion 224 is constituted of a plurality (two pieces) of block members 250 combined with each other.

At least one of the plurality of block members 250 includes a recessed portion 253 formed thereon in the extending direction of the engaging groove 223, such that combining the plurality of block members 250 results in forming the hollow portion 224 inside the second member 220.

The block members 250 shown in FIG. 11 each include a pair of planes 251, 252 parallel to each other.

One of the planes 251 includes the engaging groove 223 formed thereon as that on the second member 220. The plane 251 serves as a sliding plane for sliding motion with respect to the first plane 211 of the first member 210, in contact therewith.

The other plane 252 includes the recessed portion 253 formed so as to avoid interference with the engaging groove 223. The other plane 252 serves as the abutment plane for coupling the block members 250.

Joining the respective planes 252 of the two block members 250 with an adhesive or the like results in unifying the recessed portion 253 of the respective block members 250 thereby forming the hollow portion 224, and in thus obtaining the second member 220.

In other words, the shape of the respective block members 250 is equal to the piece obtained by splitting the second member 220 in half, such that each half portion includes the engaging groove 223.

Employing the two block members 250 instead of the second member 220 makes it easier to insert the flexible printed circuit board 140 (Ref. FIG. 2) in the hollow portion 224 in the second member 220.

To be more detailed, firstly one of the block members 250 and one first member 210 are combined, and also the other of the block members 250 and another first member 210 are combined.

Then the planes 252 of the respective block members 250 are placed so as to oppose each other, and the flexible printed circuit board 140 is interposed therebetween and set inside the hollow portion 224.

Bonding the planes 252 under such state easily completes the enclosure of the flexible printed circuit board 140 inside the hollow portion 224.

Thus, according to this exemplary embodiment, combining the first member 210 and the block members 250 (second member 220) before bonding the two block members 250 enables easily setting the flexible printed circuit board 140 inside the hollow portion 224.

In contrast, it is not easy to insert the flexible printed circuit board 140 through the hollow portion 224 from a longitudinal end portion to the other thereof, after combining the first member 210 and the second member 220 thereby forming the connecting mechanism 130. This is because in this exemplary embodiment the hollow portion 224 formed inside the second member 220 is not continuous, but a predetermined clearance is present between the second members 220 adjacent to each other. Besides, because of the lack of morphological stability in the flexible printed circuit board 140, high expertise and working cost are required for inserting the same through the hollow portion 224 in the longitudinal direction.

This exemplary embodiment is also subject to various other modifications.

Although the two block members 250 are formed in the same shape and size according to this exemplary embodiment, the two block members 250 may be of different shapes instead.

Also, though the block members 250 are bonded at the plane 252 according to this exemplary embodiment, instead a union member or a union mechanism for combining the block members 250 may be separately provided. In the case of bonding the block members 250 themselves also, a protrusion and a recess that can be fitted to each other may be provided on the respective block members 250, instead of the plane 252.

Although this exemplary embodiment exemplifies, as the first exemplary embodiment, the structure that the second member 220 is placed between the first members 210 attached to the second member 220 on the respective sides thereof, this is not the only possible structure. Instead, the second members 220 may be located on the respective sides of the first member 210. In this case, it is preferable to split the first member 210 into half, and to combine a plurality of block members. It is preferable, in this case, to erect the engaging piece 213 on one of the faces of the respective block member and to form the recessed portion on the opposite face. Such configuration enables, as in the second exemplary embodiment, setting the flexible printed circuit board 140 inside the hollow portion after combining the first member 210 (block members) and the second member 220.

This application is the National Phase of PCT/JP2008/000681 filed on Mar. 21, 2008, which claims priority based on Japanese patent application No.2007-083832 filed on Mar. 28, 2007, the entire content of which is incorporated hereinto.

Industrial Usability

The present invention is applicable to other mobile devices in addition to the mobile phone unit and other portable terminal devices. In other words, the present invention is applicable to any portable device as long as the device includes two housings and a connecting mechanism that connects those two housings. The present invention may be applied, for example, to a personal data assistance (PDA), a portable digital camera, a portable audio player, a portable image receiver and so forth.

The invention claimed is:

1. A folding portable device, comprising:
a first housing;
a second housing; and
a connecting mechanism that mechanically connects said first housing and said second housing to each other; and
wherein said connecting mechanism includes:
at least two first members, each of the at least two first members including a first engaging piece and a second engaging piece which include columnar portions, and
a second member including an engaging groove on each of two opposing surfaces, the engaging groove extending in a first direction,
wherein one of the two opposing surfaces faces a first side away from the other of the two opposing surfaces and the other of the two opposing surfaces faces a second side away from the one of the two opposing surfaces,
wherein said columnar portions of said first engaging piece of said each of the at least two first members engage with said engaging groove of said second member such that said first engaging piece can be slidably and rotatably engaged in said engaging groove, and
wherein said columnar portions of said second engaging piece of said each of the at least two first members engage with another engaging groove of another second member such that said second engaging piece can be slidably and rotatably engaged in said another engaging groove,
wherein the first and second engaging pieces protrude from the each of the at least two first members in a same direction, and
wherein one of the at least two first members is arranged on only the first side and the other of the at least two first members is arranged on only on the second side.

2. The folding portable device according to claim 1, wherein
said connecting mechanism includes said at least two first members and said second member in a plurality of numbers respectively;
said at least two first members and said second member are set to slide toward or away from each other; and
inclining said at least two first members and said second member with respect to each other can cause said first housing and said second housing to mutually assume an open state or a closed state.

3. A folding portable device, comprising:
a first housing;
a second housing;
a connecting mechanism that mechanically connects said first housing and said second housing to each other; and
a flexible printed circuit board that electrically connects said first housing and said second housing to each other;
wherein said connecting mechanism includes:
each of a plurality of first members including a first plane and two engaging pieces, each of said two engaging pieces comprising columnar portions, provided on said first plane;
each of a plurality of second members including a first interfacing plane and a second interfacing plane, the first and second interfacing planes arranged opposed from each other, an engaging groove extending in a first direction provided on each of said first and second interfacing planes for said columnar portions of said each engaging piece to be slidably and rotatably fitted, and a stopper that prevents said each engaging piece fitted in said engaging groove from coming off from said engaging groove;
wherein the first interfacing plane faces a first side away from the second interfacing plane and the second interfacing plane faces a second side away from the first interfacing plane,
wherein said each first member is engaged with one of said plurality of second members by means of one of said two engaging pieces, and with another second member adjacent to said one of said plurality of second members by means of the other of said two engaging pieces;

wherein said connecting mechanism includes a hollow portion formed along said first direction of said engaging groove in said connecting mechanism, and said hollow portion includes said flexible printed circuit board in said hollow portion, wherein the two engaging pieces protrude from the first member in a same direction, wherein the plurality of first members comprises a plurality of right first members configured to engage with the engaging groove on the first interfacing plane and a plurality of left first members configured to engage with the engaging groove on the second interfacing plane, and wherein each of the plurality of right first members is arranged on only the first side and each of the plurality of left first members is arranged on only the second side.

4. The folding portable device according to claim 3, wherein said engaging piece is erected on said first plane; and
said hollow portion is formed inside said second member so as to avoid interference with said engaging groove.

5. The folding portable device according to claim 3, wherein said engaging piece includes:
a first columnar portion erected on said first plane, and
a second columnar portion formed on said first columnar portion continuously from said first columnar portion and larger in diameter than said first columnar portion, and said engaging groove includes:
a first engaging groove formed on each of said first and second interfacing lanes for said first columnar portion to slide along said first engaging groove, and
a second engaging groove formed so as to extend from said first engaging groove, for said second columnar portion to slide along said second engaging groove.

6. The folding portable device according to claim 3, wherein
said hollow portion is formed inside said first member or said second member;
said first member or said second member including said hollow portion is respectively constituted of a combination of a plurality of block members;
at least one of said plurality of block members includes a recessed portion formed along an extending direction of said engaging groove, and
said hollow portion is formed inside said first member or said second member by combining said plurality of block members.

7. The folding portable device according to claim 4, wherein
said hollow portion is formed inside said first member or said second member;
said first member or said second member including said hollow portion is respectively constituted of a combination of a plurality of block members;
at least one of said plurality of block members includes a recessed portion formed along an extending direction of said engaging groove, and
said hollow portion is formed inside said first member or said second member by combining said plurality of block members.

8. The folding portable device according to claim 4, wherein said second member includes two block members;
said two block member each include a pair of planes parallel to each other;
one of said pair of planes includes said engaging groove, and the other of said pair of planes includes a recessed portion formed so as to avoid interference with said engaging groove; and
said second member is formed by combining said two block members via the respective latter planes.

9. The folding portable device according to claim 1, wherein said folding portable device is a folding mobile phone unit.

10. A connecting mechanism that mechanically connects a first housing and a second housing to each other, in a folding portable device including said first housing and said second housing, comprising:
at least two first members, each of the at least two first members including a first engaging piece and a second engaging piece which include columnar portions, and
a second member including an engaging groove on each of two opposing surfaces, the engaging groove extending in a first direction,
wherein one of the two opposing surfaces faces a first side away from the other of the two opposing surfaces and the other of the two opposing surfaces faces a second side away from the one of the two opposing surfaces,
wherein said columnar portions of said first engaging piece of said each of the at least two first members engage with said engaging groove of said second member such that said first engaging piece can be slidably and rotatably engaged in said engaging groove, and
wherein said columnar portions of said second engaging piece of said each of the at least two first members engage with another engaging groove of another second member such that said second engaging piece can be slidably and rotatably engaged in said another engaging groove,
wherein the first and second engaging pieces protrude from the each of the at least two first members in a same direction, and
wherein one of the at least two first members is arranged on only the first side and the other of the at least two first members is arranged on only on the second side.

11. The connecting mechanism according to claim 10, comprising said at least two first members and said second member in a plurality of numbers respectively; wherein
said at least two first members and said second member are set to slide toward or away from each other; and
inclining at least two first members and said second member with respect to each other can cause said first housing and said second housing to mutually assume an open state or a closed state.

12. A connecting mechanism that mechanically connects a first housing and a second housing to each other, in a folding portable device including said first housing, said second housing, and a flexible printed circuit board that electrically connects said first housing and said second housing to each other, comprising:
each of a plurality of first members including a first plane and two engaging pieces, each of said two engaging pieces comprising columnar portions, provided on said first plane;
each of a plurality of second members including a first interfacing plane and a second interfacing plane, the first and second interfacing planes arranged opposed from each other, an engaging groove extending in a first direction provided on each of said first and second interfacing planes for said columnar portions of said each engaging piece to be slidably and rotatably fitted, and a stopper that prevents said each engaging piece fitted in said engaging groove from coming off from said engaging groove;

wherein the first interfacing plane faces a first side away from the second interfacing plane and the second interfacing plane faces a second side away from the first interfacing plane.

wherein said each first member is engaged with one of said plurality of second members by means of one of said two engaging pieces, and with another second member adjacent to said one of said plurality of second members by means of the other of said two engaging pieces;

wherein said connecting mechanism includes a hollow portion formed along said first direction of said engaging groove in said connecting mechanism, and said hollow portion includes said flexible printed circuit board in said hollow portion, wherein the two engaging pieces protrude from the first member in a same direction, wherein the plurality of first members comprises a plurality of right first members configured to engage with the engaging groove on the first interfacing plane and a plurality of left first members configured to engage with the engaging groove on the second interfacing plane, and wherein each of the plurality of right first members is arranged on the first side and each of the plurality of left first members is arranged on only the second side.

13. The connecting mechanism according to claim 12, wherein said engaging piece is erected on said first plane; and said hollow portion is formed inside said second member so as to avoid interference with said engaging groove.

14. The connecting mechanism according to claim 12, wherein said engaging piece includes:

a first columnar portion erected on said first plane, and a second columnar portion formed on said first columnar portion continuously from said first columnar portion and larger in diameter than said first columnar portion, and said engaging groove includes:

a first engaging groove formed on each of said first and second interfacing planes for said first columnar portion to slide along said first engaging groove, and a second engaging groove formed so as to extend from said first engaging groove, for said second columnar portion to slide along said second engaging groove.

15. The connecting mechanism according to claim 12, wherein said hollow portion is formed inside said first member or said second member;

said first member or said second member including said hollow portion is respectively constituted of a combination of a plurality of block members;

at least one of said plurality of block members includes a recessed portion formed along an extending direction of said engaging groove, and said hollow portion is formed inside said first member or said second member by combining said plurality of block members.

16. The connecting mechanism according to claim 13, wherein said hollow portion is formed inside said first member or said second member;

said first member or said second member including said hollow portion is respectively constituted of a combination of a plurality of block members;

at least one of said plurality of block members includes a recessed portion formed along an extending direction of said engaging groove, and said hollow portion is formed inside said first member or said second member by combining said plurality of block members.

17. The connecting mechanism according to claim 13, wherein said second member includes two block members;

said two block member each include a pair of planes parallel to each other;

one of said pair of planes includes said engaging groove, and the other of said pair of planes includes a recessed portion formed so as to avoid interference with said engaging groove; and said second member is formed by combining said two block members via the respective latter planes.

18. The folding portable device according to claim 1, wherein the first and second engaging pieces protrude from the at least two first members in a direction perpendicular from the first direction.

19. The folding portable device according to claim 1, wherein the first engaging piece slides in the second member in the first direction and the second engaging piece slides in the another second member in the first direction.

* * * * *